United States Patent
Wobben

(10) Patent No.: US 6,891,281 B2
(45) Date of Patent: May 10, 2005

(54) METHOD FOR OPERATING A WIND POWER STATION AND WIND POWER STATION

(76) Inventor: Aloys Wobben, Argestrasse 19, Aurich, D-26607 (DE)

( * ) Notice: Subject to any disclaimer, the term of this patent is extended or adjusted under 35 U.S.C. 154(b) by 172 days.

(21) Appl. No.: 10/276,116
(22) PCT Filed: Mar. 31, 2001
(86) PCT No.: PCT/EP01/03705
§ 371 (c)(1), (2), (4) Date: Apr. 21, 2003
(87) PCT Pub. No.: WO01/86143
PCT Pub. Date: Nov. 15, 2001

(65) Prior Publication Data
US 2003/0155773 A1 Aug. 21, 2003

(30) Foreign Application Priority Data
May 11, 2000 (DE) .......................... 100 22 974

(51) Int. Cl.$^7$ ................................ H02J 3/00
(52) U.S. Cl. ................ 290/44; 290/55; 322/20; 322/29
(58) Field of Search .................. 290/1 A, 2, 44, 290/55; 322/7, 20, 29

(56) References Cited

U.S. PATENT DOCUMENTS

| 4,189,648 A |   | 2/1980 | Harner ........................... 290/44 |
| 4,565,929 A | * | 1/1986 | Baskin et al. .................. 290/44 |

(Continued)

FOREIGN PATENT DOCUMENTS

| DE | 368799 | 2/1923 |
| DE | 33 08 566 A1 | 10/1983 |
| DE | 33 11 299 A1 | 10/1984 |
| DE | 41 32 274 A1 | 5/1993 |
| DE | 296 21 449 U1 | 2/1997 |
| DE | 197 56 777 A1 | 7/1999 |
| EP | 0 223 729 B1 | 11/1990 |
| EP | 0 666 633 A1 | 8/1995 |
| GB | 2 330 256 A | 4/1999 |
| JP | 58-095998 | 6/1983 |
| JP | 62/121872 | 6/1987 |
| JP | 11-062814 | 3/1999 |

OTHER PUBLICATIONS

Lyons, J. et al., "The Control of Variable–Speed Wind Turbine Generators," *Proc. of the IEEE Conf. on Decision and Control*, Bd. 3, pp. 1417–1421, Dec. 14, 1983, XP000612992.

(Continued)

*Primary Examiner*—Nicholas Ponomarenko
(74) *Attorney, Agent, or Firm*—Seed IP Law Group PLLC

(57) ABSTRACT

The present invention concerns a method of operating a wind power installation having an electrical generator drivable by a rotor for delivering electrical power to an electrical network to which the wind power installation is connected. The invention further concerns a wind power installation comprising a rotor and an electrical generator coupled to the rotor for delivering electrical power to an electrical consumer, in particular an electrical network.

The object of the present invention is to eliminate the above-described problems when wind power installations are connected to the electrical network.

A method of operating a wind power installation having a generator for delivering electrical power to an electrical network characterised in that the power delivered to the network by the generator is regulated or adjusted in dependence on the network frequency of the electrical network.

16 Claims, 3 Drawing Sheets

U.S. PATENT DOCUMENTS

| | | | | | |
|---|---|---|---|---|---|
| 4,788,653 | A | * | 11/1988 | Henderson et al. | 708/300 |
| 5,225,712 | A | | 7/1993 | Erdman | 290/44 |
| 5,798,631 | A | * | 8/1998 | Spee et al. | 322/25 |
| 5,907,192 | A | | 5/1999 | Lyons et al. | 290/44 |
| 6,323,624 | B1 | * | 11/2001 | Henriksen | 322/20 |
| 6,420,795 | B1 | * | 7/2002 | Mikhail et al. | 290/44 |
| 6,452,289 | B1 | * | 9/2002 | Lansberry et al. | 307/25 |
| 6,512,966 | B2 | * | 1/2003 | Lof et al. | 700/291 |
| 6,670,721 | B2 | * | 12/2003 | Lof et al. | 290/44 |

OTHER PUBLICATIONS

Heuck, K. et al., "Elektrische Energieversorgung," pp. 25–35, 1984, ISBN 3–528–08547–9.

Boll, G., "Frequenz–Leistungs–Regelung im Verbundnetz," *ETZ–A*, vol. 79, pp. 894–902, 1958.

Heier, "Windkraftanlagen im Netzbetrieb," B.G. Teubner, Stuttgart, 2 Edition, pp. 310–343, 1996.

Bonneville Power Administration, "Technical Requirements for the Interconnection of Generation Resources," pp. 1–53, Apr. 1999.

American Wind Energy Association, "How Difficult is it to Integrate Wind Turbines with Utilities?, " *Wind Energy Weekly*, No. 680, Jan. 15, 1996.

Eltra, "First Edition: Specifications for Connecting Wind Farms to the Transmission Network," pp. 1–13, Jul. 14, 1999.

Eltra, "Second Edition: Specifications for Connecting Wind Farms to the Transmission Network," pp. 1–13, Jul. 14, 1999.

Schwartz, J., "Will Your Utility Interact with You? –Utility Interactive inverter Safety," *Home Power*, No. 71, Jun./Jul. 1999.

"IEEE Recommended Practice for Utility Interface of Photovoltaic (PV) Systems," *IEEE*, pp. 1–26, Apr. 3, 2000.

"Electric Power Wheeling and Dealing: Technological Considerations for Increasing Competition," NTIS order #PB89–232748, May 1989.

"Netzanschlussregeln" pp. 1–43, Dec. 1999.

Deutsche Verbundgesellschaft, "–Der GridCode–Kooperationsregln fü die Deutschen Übertragungnetzbetrieber," pp. 1–38, Jul. 1998.

"Netzanschlussregeln –allgemein," pp. 1–39, Dec. 2001.

Ergänzende Netzanschlussregeln für Windenergieanlagen, pp. 1–17, Dec. 2001.

Wobben, A., "Improvement of the Grid Compatibility of Wind Energy Converters, taking the E–40/500kW as an Example," in *Proceedings of the Deutsche Windenergie–Konferenz*, Aurich, Germany, Oct. 23–24, 1996, pp. 180–183.

Eltra, "Udkast: Tilslutningsbetingelser for Vindmølleparker til Transmissionsnettet," pp. 1–12, Oct. 13, 1998.

"1. Udgave –Tilslutningsbetingelser for Vindmølleparker til Transmissionsnettet," pp. 1–13, Jul. 14, 1999.

"2. Udgave –Tilslutningsbetingelser for Vindmølleparker til Transmissionsnettet," pp. 1–13, Apr. 17, 2000.

* cited by examiner

METHOD FOR OPERATING A WIND POWER STATION AND WIND POWER STATION

DESCRIPTION

The present invention concerns a method of operating a wind power installation having an electrical generator drivable by a rotor for delivering electrical power to an electrical network to which the wind power installation is connected. The invention further concerns a wind power installation comprising a rotor and an electrical generator coupled to the rotor for delivering electrical power to an electrical consumer, in particular an electrical network.

In the case of weak electrical (island) networks the network frequency rises very sharply (abruptly) when a relatively large consumer is separated from the electrical network. The drive machines such as for example diesel engines, water wheels or the like require some time in order then to reduce their (mechanical and electrical) power. During that time those generators produce more energy than is taken from the electrical network. That energy is then consumed for accelerating the generators. This means that the rotary speed and therewith also the network frequency rises.

As many items of electrical equipment, for example computers, electric motors and the like, which are connected to the electrical network are however not designed for fluctuating network frequencies or abrupt changes therein, that can result in damage to electrical machines, going as far as destruction thereof.

The object of the present invention is to eliminate the above-described problems when wind power installations are connected to the electrical network.

In accordance with the invention that object is attained by a method having the features set forth in claim 1 and a wind power installation having the features set forth in claim 4. Advantageous developments are described in the appendant claims.

In accordance with the invention it is proposed that, if wind power installations are operated on such weak networks, their (mechanical and) electrical power is to be controlled in dependence on the rising network frequency. That is intended to prevent a further rise in the network frequency or to achieve a reduction in the network frequency.

The invention is described in greater detail hereinafter by means of an embodiment. In the drawing.

Figure 1:
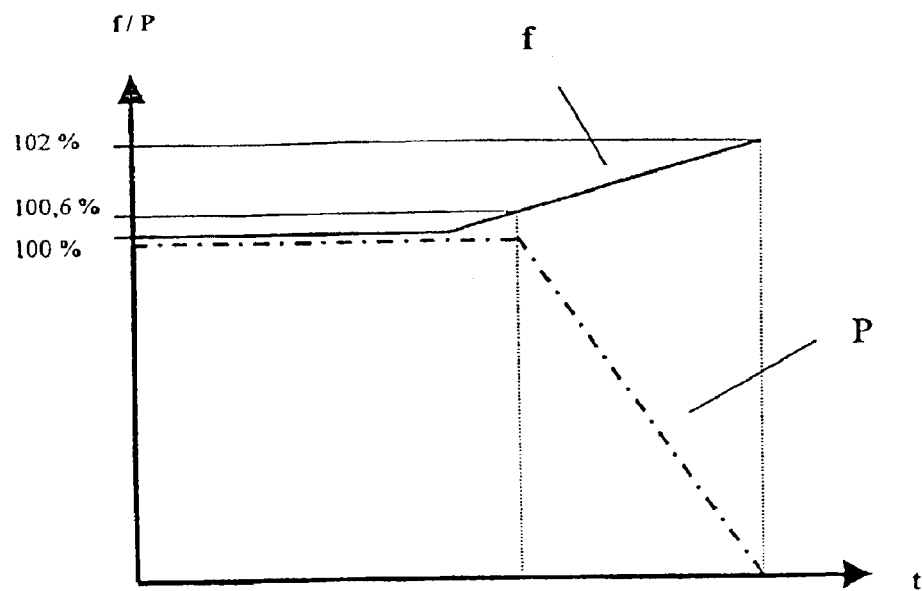
FIG. 1 shows a frequency/power time diagram of a wind power installation.
Figure 2:
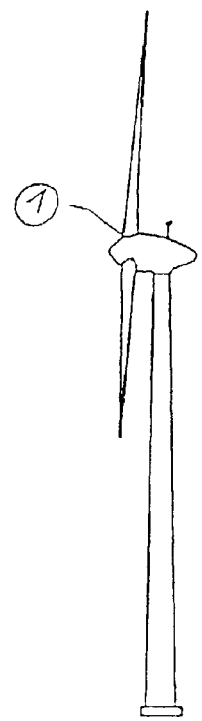
FIG. 2 shows a side view of a wind power installation.

FIG. 1 shows the demand on a wind power installation for its output power P to be reduced in dependence on the electrical frequency f of the network. The value of 100% in that respect represents the reference frequency (50 Hz, 60 Hz) of the electrical network. The values 100.6% and 102% respectively are correspondingly higher values of the network frequency f.

The electrical power of the wind power installation is not yet regulated downwardly for example upon a rise in the network frequency by 0.6% (that is to say to 100.6%). If thereafter the network frequency rises still further then the electrical power of the wind power installation is regulated down. In the illustrated embodiment the electrical power of the wind power installation is regulated down to zero power, with a rise in the network frequency to 102%.

Figure 3:
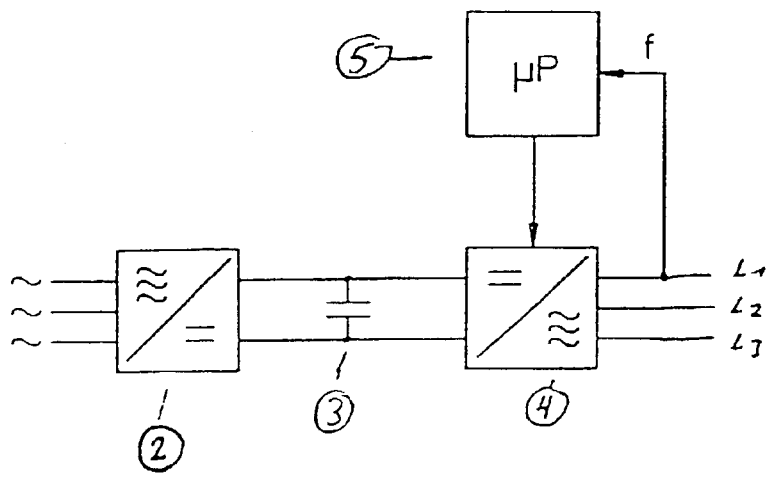
FIG. 3 shows a block circuit diagram of an inverter, controlled by a microprocessor, of a wind power installation.

FIG. 3 shows an embodiment of a wind power installation which satisfies that demand. The wind power installation has adjustable rotor blades (pitch regulation for the rotor blades) so that the mechanical power of the wind power installation can be regulated down. If for example the attack angle of the rotor blades relative to the wind is adjusted, then the force on the rotor blades can also be reduced to a desired value. The electrical alternating current of the generator (not shown) which is connected to the rotor carrying the rotor blades is rectified by means of a rectifier 2 and smoothed by means of a capacitor 3. The inverter 4 then converts the dc voltage into an alternating current which is delivered to the network $L_1$, $L_2$, $L_3$. The frequency of that output current is predetermined by the network. The regulating device 5 comprising a microprocessor measures the network frequency and controls the power switches of the inverter in such a way that the output frequency corresponds to the network voltage (network frequency). If—as described above—the network frequency rises then the electrical power is regulated downwardly, as shown in FIG. 1.

Figure 4:
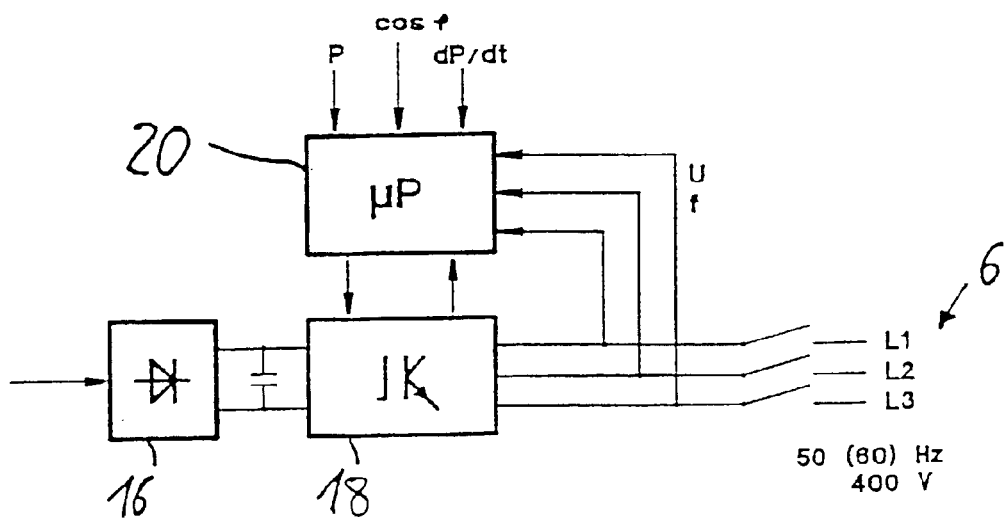
FIG. 4 illustrates a regulating device of a wind power installation.

FIG. 4 shows the regulating device according to the invention. The diagrammatically illustrated rotor 4 of the wind power installation is coupled to a generator G which provides an electrical power which depends on the wind speed and thus the wind power. The ac voltage produced by the generator G is firstly rectified and then converted by means of the inverter into an ac voltage which is of a frequency corresponding to the network frequency. The network voltage is ascertained at the network feed-in point of the network by means of the network frequency pick-up. As soon as the network frequency exceeds a predetermined value—see FIG. 1—the electrical power delivered is reduced in order to counteract a further rise in the network frequency. Accordingly the network frequency of the network is regulated by means of the regulating device to a desired network frequency value, or at least a further rise therein is prevented.

Network frequency fluctuations can be avoided or considerably reduced by a feed, regulated in that way, of the power delivered by the wind power installation, into the network.

Figure 5:
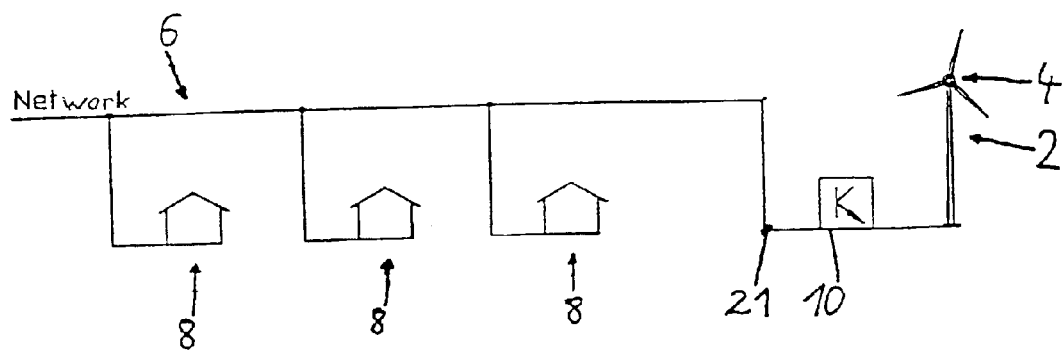
FIG. 5 illustrates coupling of a wind power installation to an electrical network.

FIG. 5 illustrates the coupling of a wind power installation to an electrical network, wherein the electrical power generated by the wind power installation is delivered into the network at the network feed-in point. Connected to the electrical network are a plurality of consumers, diagrammatically shown in the form of houses in the illustrated example.

Figure 6:
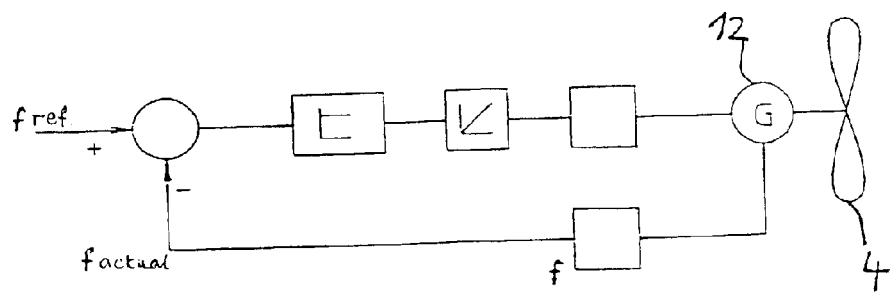
FIG. 6 shows an alternative arrangement to FIG. 3.

FIG. 6 shows essential components of the control-regulating device in a somewhat different view from FIG. 3. The control and regulating arrangement has a rectifier in which the ac voltage generated in the generator is rectified. A frequency converter connected to the rectifier converts the dc voltage which is firstly rectified in the intermediate circuit into an ac voltage which is fed in the form of a three-phase ac voltage into the network by way of the lines $L_1$, $L_2$ and $L_3$. The frequency converter is controlled by means of the microcomputer which is part of the whole regulating device.

For that purpose the microprocessor is coupled to the frequency converter. The input parameters for regulation of the voltage at which the electrical power made available by the wind power installation 2 is fed into the network are the present network voltage, the network frequency f, the electrical power P of the generator, the reactive power factor cos Φ and the power gradient dP/dt. The microprocessor implements the regulation according to the invention of the voltage which is to be fed in, at its desired network frequency.

What is claimed is:

1. A method of operating a wind power installation having a generator for delivering electrical power to an electrical network characterized in that the power delivered to the network by the generator is regulated or adjusted in dependence on the network frequency of the electrical network, wherein electrical power delivered by the generator and fed into the network is reduced if the network frequency of the electrical network exceeds a predetermined value.

2. A method according to claim 1 characterised in that the fed-in power of the wind power installation is reduced if the network frequency is more than 3‰, preferably 6‰ above its reference value.

3. A wind power installation for carrying out the method according to claim 1 comprising a rotor and an electrical generator coupled to the rotor for delivering electrical power to an electrical network, characterised by a regulating device having a frequency pick-up for measuring the frequency of the electrical voltage at the network (current) and that the power delivered to the network by the generator is adjustable in dependence on the network frequency measured by the frequency pick-up.

4. A wind power installation according to claim 3 characterised in that the regulating device has a microprocessor.

5. A wind power installation according to claim 4 characterised in that the wind power installation has an inverter which is coupled to the microprocessor.

6. A wind power installation according to one of the preceding claim 3 characterised in that the mechanical power of the wind power installation is reduced by the adjustable rotor blades being set into the wind.

7. A wind power installation according to one of the preceding claim 3 characterised in that the wind power installation does not deliver any electrical power to the network if the network frequency exceeds a predetermined value of its reference value, preferably 2% of its reference value.

8. A method of operation a wind power installation having a generator for delivering electrical power to an electrical network comprising:

generating electrical power from the wind power installation;

providing the electrical power to a network;

measuring the frequency of the electrical power on the network;

comparing the measured frequency to a reference value; and reducing the amount of electrical power provided on the network by the wind power installation if the frequency of the electrical power on the network exceeds the reference value by a threshold value.

9. The method according to claim 8 wherein the threshold value is 2‰.

10. A method of operation a wind power installation having a generator for delivering electrical power to an electrical network characterized in that the power delivered to the network by the generator is regulated or adjusted in dependence on the network frequency of the electrical network, whereby the electrical power delivered by the generator and fed in to the network is reduced if the network frequency of the electrical network exceeds a predetermined value of more than 3‰.

11. A wind power installation comprising:

wind turbine blades exposed to ambient wind;

a rotor coupled to the blades of the wind turbine;

an electrical generator coupled to the rotor for generating electrical power and providing it to an electrical network;

a regulating device having a frequency sensor for measuring the frequency of the electrical voltage of the network; and a power adjustment assembly for reducing the power delivered to the network by the generator based on the network frequency measured by the frequency sensor being different by a threshold value.

12. A wind power installation according to claim 11 characterised in that the regulating device has a microprocessor.

13. A wind power installation according to claim 12 characterised in that the wind power installation has an inverter which is coupled to the microprocessor.

14. A wind power installation according to claim 11 characterised in that the mechanical power of the wind power installation is reduced by the adjustable rotor blades being feathered with respect to the wind.

15. A wind power installation according to claim 11 characterised in that the wind power installation reduces the electrical power provided to the network if the network frequency exceeds a predetermined reference value by more than 2‰.

16. A wind power installation according to claim 11 characterised in that the wind power installation reduces the electrical power to zero so that no power is provided to the network if the network frequency exceeds a predetermined reference value by more than 2%.

* * * * *

UNITED STATES PATENT AND TRADEMARK OFFICE
CERTIFICATE OF CORRECTION

PATENT NO. : 6,891,281 B2
DATED : May 10, 2005
INVENTOR(S) : Aloys Wobben

It is certified that error appears in the above-identified patent and that said Letters Patent is hereby corrected as shown below:

Column 3,
Lines 39-40 and 43-44, "one of the preceding" should be omitted.

Signed and Sealed this

Eleventh Day of October, 2005

JON W. DUDAS
*Director of the United States Patent and Trademark Office*